United States Patent
Shavit et al.

(10) Patent No.: US 12,079,067 B2
(45) Date of Patent: Sep. 3, 2024

(54) SYSTEMS AND METHODS FOR ADVANCED HIGH-PERFORMANCE LOGGING AND DEBUG INFRASTRUCTURE

(71) Applicant: Dell Products L.P., Round Rock, TX (US)

(72) Inventors: Itai Shavit, Ramat Gan (IL); Roy Koren, Kfar Saba (IL); Vladimir Shveidel, Pardes-Hana (IL); Benny Kirenberg, Beit Shemesh (IL); Leron Fliess, Kiryat Ono (IL)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 18/160,104

(22) Filed: Jan. 26, 2023

(65) Prior Publication Data

US 2024/0256374 A1 Aug. 1, 2024

(51) Int. Cl.
*G06F 11/07* (2006.01)

(52) U.S. Cl.
CPC ...... *G06F 11/0784* (2013.01); *G06F 11/0721* (2013.01)

(58) Field of Classification Search
CPC .......................... G06F 11/0784; G06F 11/0721
USPC ...................................................... 714/57, 45
See application file for complete search history.

(56) References Cited

U.S. PATENT DOCUMENTS

| | | | |
|---|---|---|---|
| 2009/0125580 A1* | 5/2009 | Canning | H04L 67/125 709/203 |
| 2012/0102263 A1* | 4/2012 | Aswadhati | G11C 16/00 711/E12.008 |
| 2017/0070363 A1* | 3/2017 | Watkins | H04L 47/39 |
| 2021/0349777 A1* | 11/2021 | Liu | G06F 11/0706 |

FOREIGN PATENT DOCUMENTS

WO WO-2022155919 A1 * 7/2022

* cited by examiner

*Primary Examiner* — Chae M Ko
(74) *Attorney, Agent, or Firm* — Brian J. Colandreo; Heath M. Sargeant; Holland & Knight LLP

(57) ABSTRACT

A method, computer program product, and computer system for generating, by a computing device, a debug message of a plurality of debug messages, wherein a format of the debug message may be a binary format that includes information, and wherein the information may include debug header information and one or more values of optional parameters. It may be determined that the debug message and a portion of the plurality of debug messages are associated with one or more debug levels. Each respective processor core may be allocated with a separate cyclic buffer that contains the information for each of the debug messages that are associated with the one or more debug levels and written while each respective processor core is active.

20 Claims, 5 Drawing Sheets

SYSTEMS AND METHODS FOR ADVANCED HIGH-PERFORMANCE LOGGING AND DEBUG INFRASTRUCTURE

BACKGROUND

Generally, development and maintenance of complex systems may require strong debugging capabilities. Such strong debugging capabilities may constantly provide quality fine-grained information describing system flows on one hand; however, this tends to compromise the system's performance and storage capacity.

BRIEF SUMMARY OF DISCLOSURE

In one example implementation, a method, performed by one or more computing devices, may include but is not limited to generating, by a computing device, a debug message of a plurality of debug messages, wherein a format of the debug message may be a binary format that includes information, and wherein the information may include debug header information and one or more values of optional parameters. It may be determined that the debug message and a portion of the plurality of debug messages are associated with one or more debug levels. Each respective processor core may be allocated with a separate cyclic buffer that contains the information for each of the debug messages that are associated with the one or more debug levels and written while each respective processor core is active.

One or more of the following example features may be included. Each of the debug messages may be classified into different channels based upon, at least in part, retention time and usage of each of the debug messages. The different channels may include a volatile channel. The different channels may include a persistent channel. Each of the debug messages may be indexed by type and value. A pattern of each of the debug messages may be stored external from the separate cyclic buffer. The binary format may be decoded to human readable text on demand.

In another example implementation, a computing system may include one or more processors and one or more memories configured to perform operations that may include but are not limited to generating a debug message of a plurality of debug messages, wherein a format of the debug message may be a binary format that includes information, and wherein the information may include debug header information and one or more values of optional parameters. It may be determined that the debug message and a portion of the plurality of debug messages are associated with one or more debug levels. Each respective processor core may be allocated with a separate cyclic buffer that contains the information for each of the debug messages that are associated with the one or more debug levels and written while each respective processor core is active.

One or more of the following example features may be included. Each of the debug messages may be classified into different channels based upon, at least in part, retention time and usage of each of the debug messages. The different channels may include a volatile channel. The different channels may include a persistent channel. Each of the debug messages may be indexed by type and value. A pattern of each of the debug messages may be stored external from the separate cyclic buffer. The binary format may be decoded to human readable text on demand.

In another example implementation, a computer program product may reside on a computer readable storage medium having a plurality of instructions stored thereon which, when executed across one or more processors, may cause at least a portion of the one or more processors to perform operations that may include but are not limited to generating a debug message of a plurality of debug messages, wherein a format of the debug message may be a binary format that includes information, and wherein the information may include debug header information and one or more values of optional parameters. It may be determined that the debug message and a portion of the plurality of debug messages are associated with one or more debug levels. Each respective processor core may be allocated with a separate cyclic buffer that contains the information for each of the debug messages that are associated with the one or more debug levels and written while each respective processor core is active.

One or more of the following example features may be included. Each of the debug messages may be classified into different channels based upon, at least in part, retention time and usage of each of the debug messages. The different channels may include a volatile channel. The different channels may include a persistent channel. Each of the debug messages may be indexed by type and value. A pattern of each of the debug messages may be stored external from the separate cyclic buffer. The binary format may be decoded to human readable text on demand.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
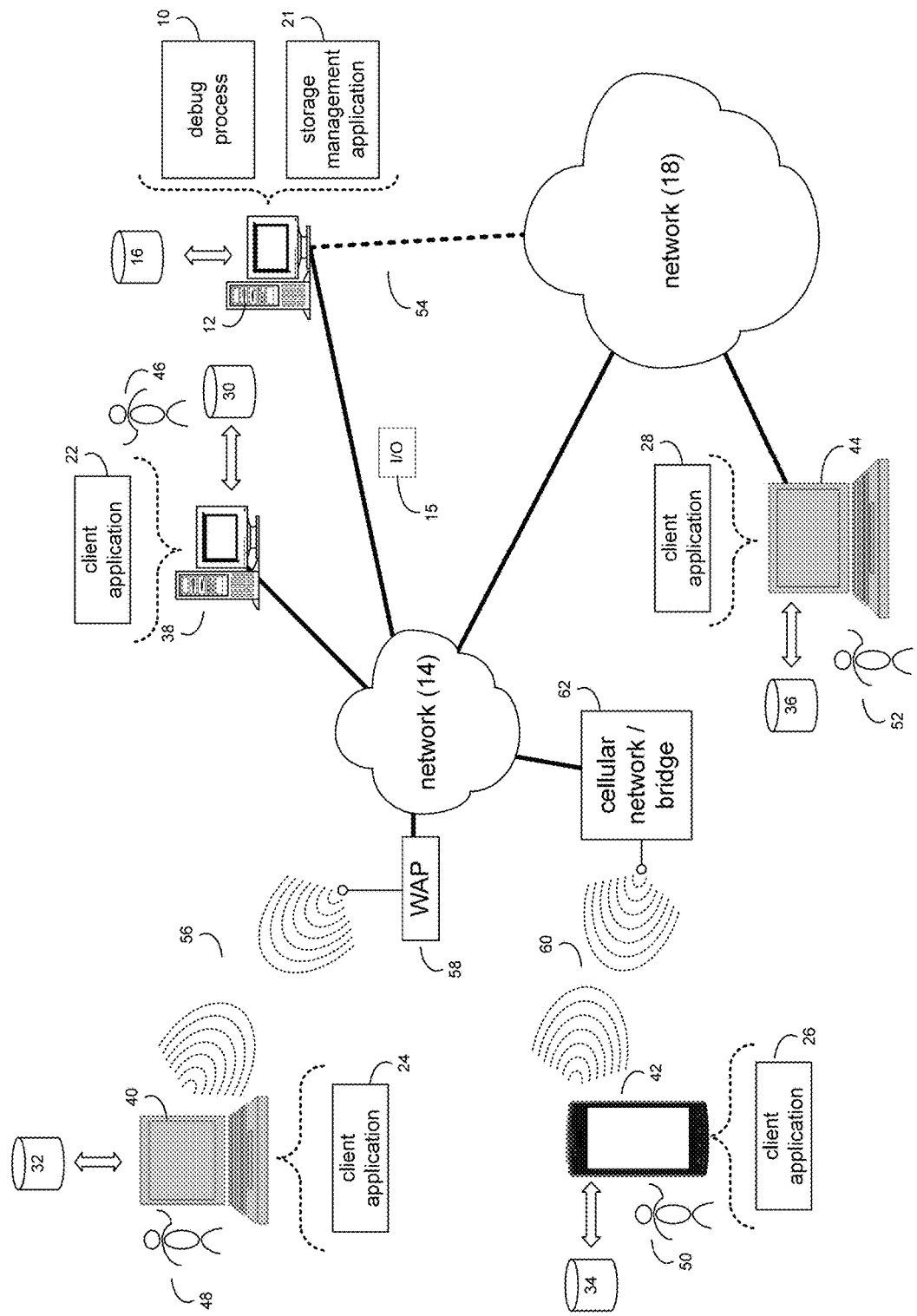
FIG. 1 is an example diagrammatic view of a debug process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit,"

"module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown debug process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a Redundant Array of Inexpensive Disks/ Redundant Array of Independent Disks (RAID) device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a debug process, such as debug process 10 of FIG. 1, may generate, by a computing device, a debug message of a plurality of debug messages, wherein a format of the debug message may be a binary format that includes information, and wherein the information may include debug header information and one or more values of optional parameters. It may be determined that the debug message and a portion of the plurality of debug messages are associated with one or more debug levels. Each respective processor core may be allocated with a separate cyclic buffer that contains the information for each of the debug messages that are associated with the one or more debug levels and written while each respective processor core is active.

In some implementations, the instruction sets and subroutines of debug process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, debug process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, debug process 10 and/or storage management application 21 may be accessed via one or more of client applications 22, 24, 26, 28. In some implementations, debug process 10 may be a standalone application, or may be an applet/application/ script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within debug process 10, a component of debug process 10, and/or one or more of client applications 22, 24, 26, 28. In some implementations, one or more of client applications 22, 24, 26, 28 may be a standalone application, or may be an applet/ application/script/extension that may interact with and/or be executed within and/or be a component of debug process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM).

Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of debug process 10 (and vice versa). Accordingly, in some implementations, debug process 10 may be a purely server-side application, a purely client-side application, or a hybrid server-side/client-side application that is cooperatively executed by one or more of client applications 22, 24, 26, 28 and/or debug process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, debug process 10, and storage management application 21, taken singly or in any combination, may effectuate some or all of the same functionality, any description of effectuating such functionality via one or more of client applications 22, 24, 26, 28, debug process 10, storage management application 21, or combination thereof, and any described interaction(s) between one or more of client applications 22, 24, 26, 28, debug process 10, storage management application 21, or combination thereof to effectuate such functionality, should be taken as an example only and not to limit the scope of the disclosure.

In some implementations, one or more of users 46, 48, 50, 52 may access computer 12 and debug process 10 (e.g., using one or more of client electronic devices 38, 40, 42, 44) directly through network 14 or through secondary network 18. Further, computer 12 may be connected to network 14 through secondary network 18, as illustrated with phantom link line 54. Debug process 10 may include one or more user interfaces, such as browsers and textual or graphical user interfaces, through which users 46, 48, 50, 52 may access debug process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
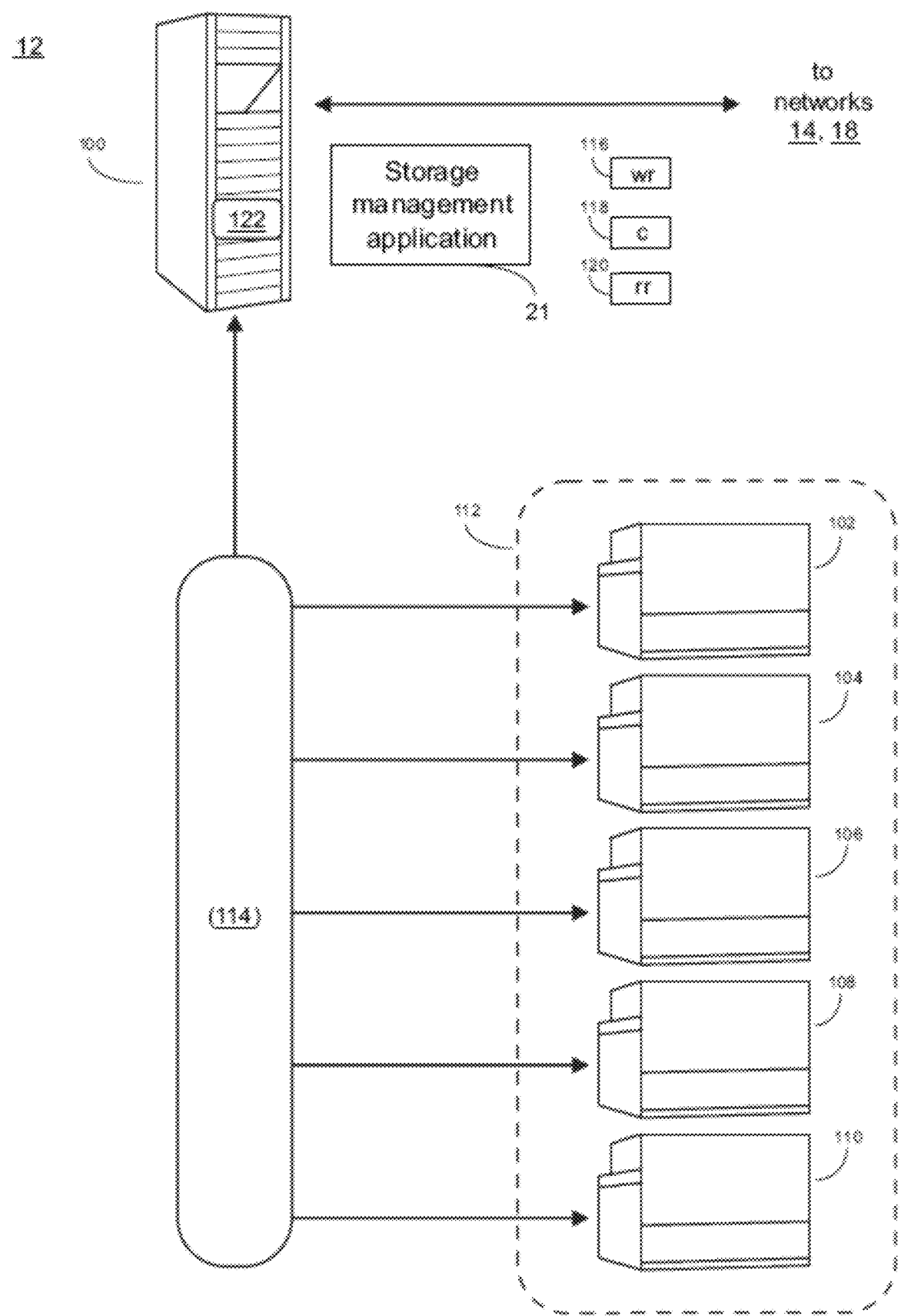
FIG. 2 is an example diagrammatic view of a storage system of FIG. 1 according to one or more example implementations of the disclosure.
Figure 3:
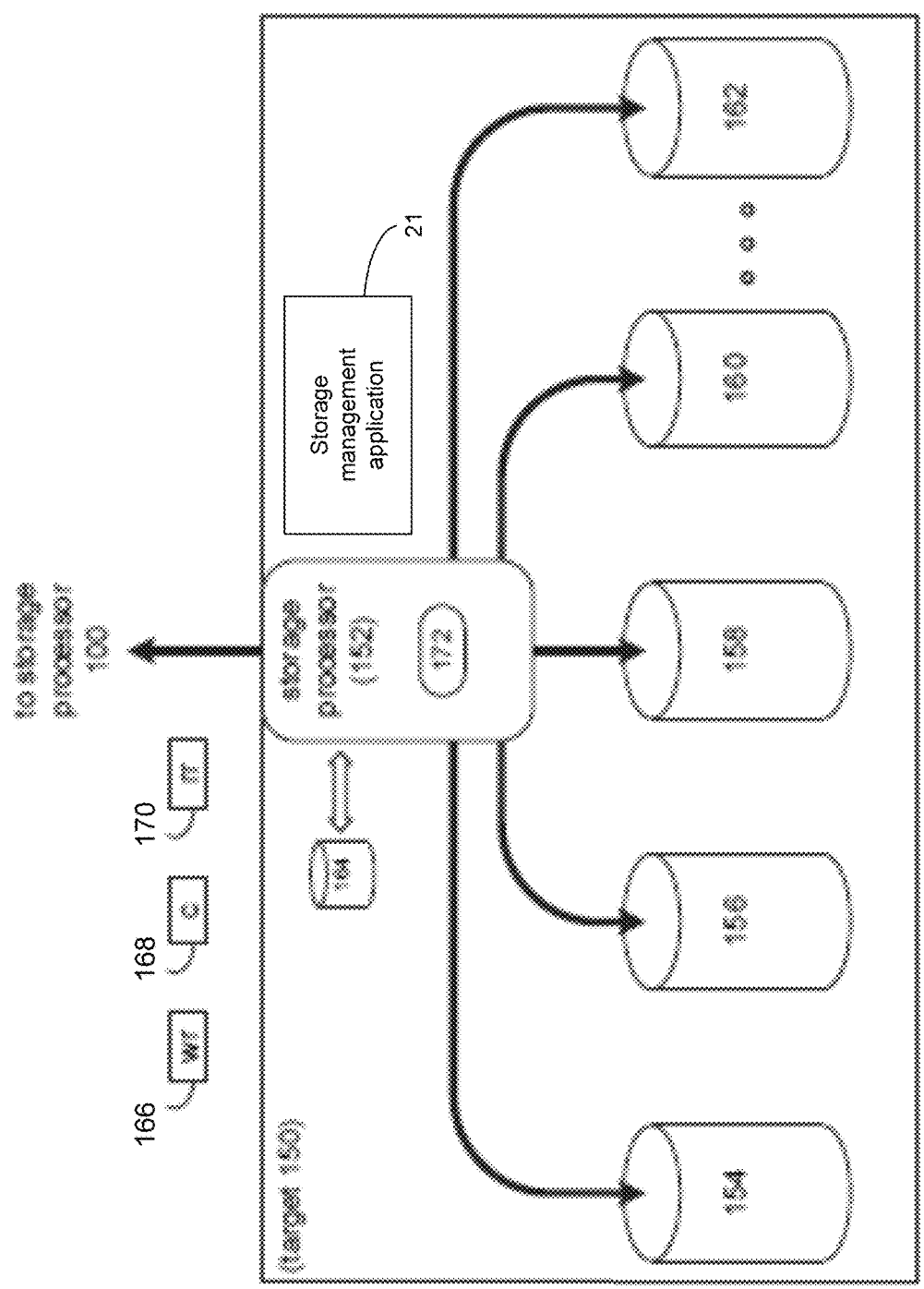
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or debug process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, generally, development and maintenance of complex systems may require strong debugging capabilities. Such strong debugging capabilities may constantly provide quality fine-grained information describing system flows on one hand; however, this tends to compromise the system's performance and storage capacity. Therefore, as will be discussed in greater detail below, the present disclosure provides an optimal debug infrastructure that may have the following example and non-limiting properties: (1) "Always-on," no need to activate. This may help root-causing bugs within a "single shot", which may be important for field issues, as well as lab issues that are not easily reproduced; (2) Having a minimal memory/on-disk footprint required while providing long history of detailed information on system flows; (3) Negligible performance impact; (4) Allowing multiple usages, e.g., maintain separate channels for short-term and long-term history; and (5) Enabling fast and efficient search over large amounts of debug data. By having an infrastructure that complies with some or all of the above, it may maximize the number of defects detected (e.g., in-house), while providing means for quality monitoring and maintenance of systems with limited access, such as in customer sites.

Thus, as will be discussed in greater detail below, the present disclosure may provide a high-performance "logging" and debug infrastructure that enables tracking of in-flight transactions throughout the system, in a very fine-grained scale (e.g., around individual I/Os), without affecting system performance. Some of the example and non-limiting features may include an (1) an "always on" mode, where different debug levels are available, but the basic level is always enabled; (2) debug information that is written to RAM as binary data, in a compact format, optimized for best utilization of allocated memory space; (3) a lockless implementation that uses a separate buffer per CPU core; and (4) a user friendly system where debug messages are variable sized and allow using a flexible printf-style syntax (formatted string).

As will also be discussed below, when processing a debug message, the trace level may indicate whether this message need to be processed or ignored, and if processed, the trace channel plus the current running core may determine to which cyclic buffer should this message be written. Trace level and channel may be assigned with values beforehand (at code writing phase).

As will be discussed below, debug process 10 may at least help, e.g., improve debugging technology that is necessarily rooted in computer technology in order to improve existing technological processes associated with, e.g., being integrated into the practical application of debugging. It will be appreciated that the computer processes described throughout are integrated into one or more practical applications, and when taken at least as a whole are not considered to be well-understood, routine, and conventional functions.

Figure 4:
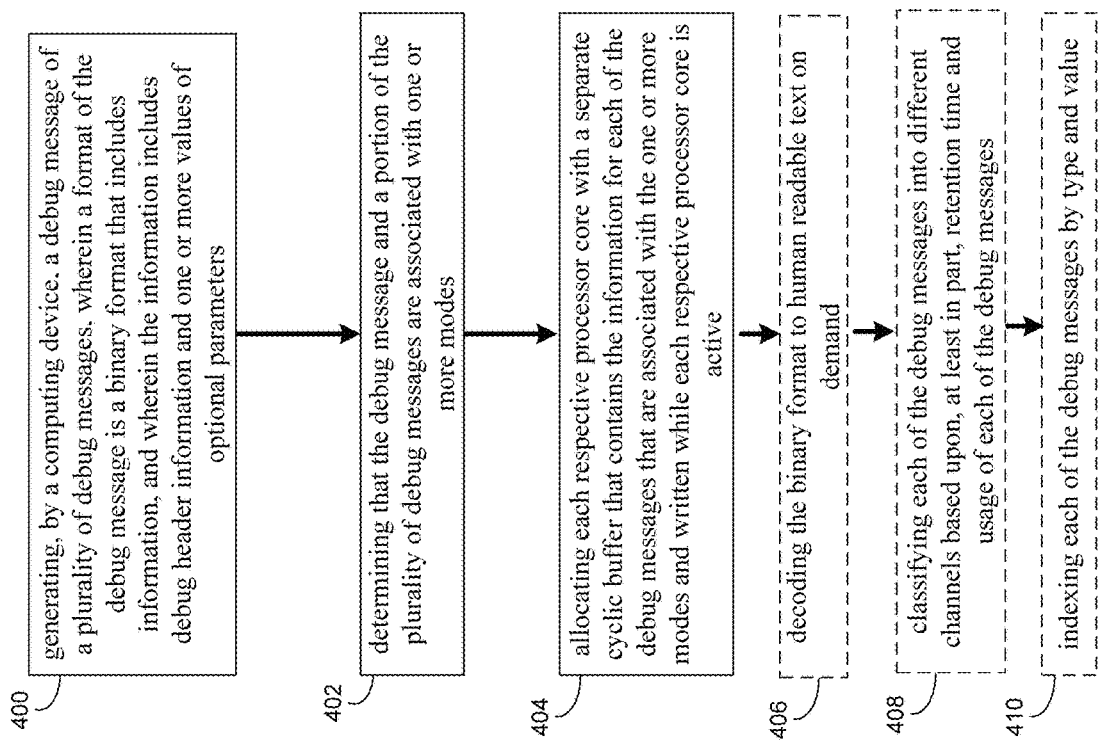
FIG. 4 is an example flowchart of a debug process according to one or more example implementations of the disclosure.
Figure 5:
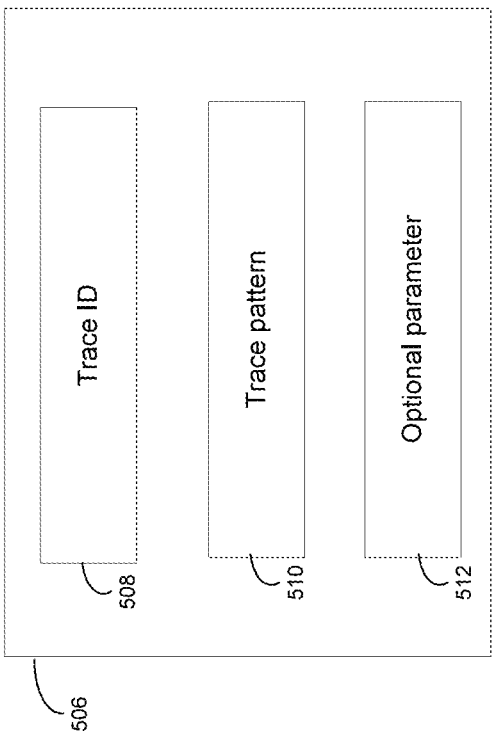
FIG. 5 is an example diagrammatic view of debug data and elements of a debug message of a storage system of FIG. 1 according to one or more example implementations of the disclosure.
Figure 5:
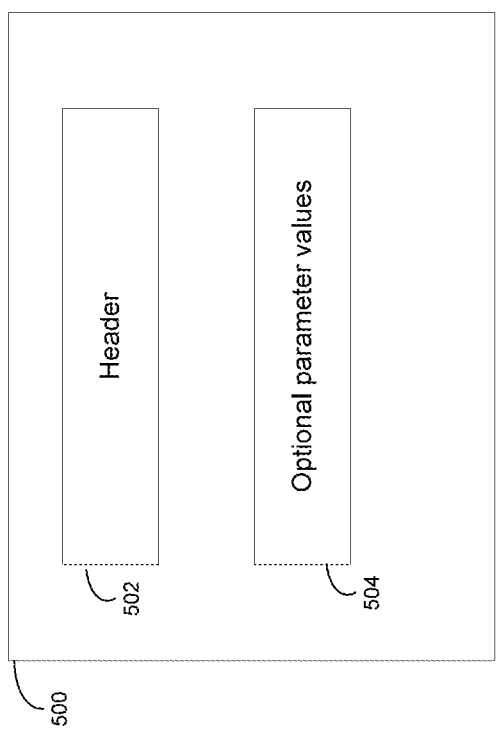

The Debug Process:

As discussed above and referring also at least to the example implementations of FIGS. 4-5, debug process 10 may generate 400, by a computing device, a debug message of a plurality of debug messages, wherein a format of the debug message may be a binary format that includes information, and wherein the information may include debug header information and one or more values of optional parameters. Debug process 10 may determine 402 that the debug message and a portion of the plurality of debug messages are associated with one or more debug levels. Debug process 10 may classify 408 each of the debug messages into different channels based upon, at least in part, retention time and usage of each of the debug messages. Debug process 10 may allocate 404 each respective processor core with a separate cyclic buffer that contains the information for each of the debug messages that are associated with the one or more debug levels and written while each respective processor core is active.

For example, and also referring to the example implementations of FIGS. 4-5, in some implementations, debug process 10 may generate 400, by a computing device, a debug message (e.g., debug message 500) of a plurality of debug messages, wherein a format of the debug message may be a binary format that includes information, and wherein the information may include debug header information (e.g., header 502) and one or more values of optional parameters (e.g., optional parameter values 504). For example, and as referred to herein for ease of explanation only, a single debug message generated 400 by debug process 10 will be referred to as a trace.

Here is an example and sample trace as it may appear in source code:
TRACE_H(DP_DATA_VOLA_CH, TRACE_VOLA_ID (3695), LS_TRANSIT, LS_TRANSIT_TRACE_HIGH,
"WARN: Req % p—DeleteObjectActor unexpected Desc % u (Desc slot % u)", mRequest, TransitDeleteKeyValueDescList[i]->mDescNum, i);

As shown in FIG. 5, the example and non-limiting main elements of a trace (e.g., trace 506) may include: a unique (statically assigned) trace ID (e.g., trace ID 508), the trace pattern (e.g., trace pattern 510), optional parameters (e.g., optional parameter (512), where additional trace elements will be described further below.

In some implementations, a pattern of each of the debug messages may be stored external from the separate cyclic buffer. For instance, in some implementations, each trace ID may be mapped by debug process 10 into a formatting pattern containing the associated text. To save space, in some implementations, a trace may be split into:

(1) Data that is known in advance (e.g., the trace pattern). This data should not be part of a trace data as-is; generally, it may be maintained on an external storage and only referenced from trace data.

(2) Data that is only available at runtime (e.g., the values of all optional parameters). This data should be kept as part of a trace data.

In some implementations, the in-memory (and/or on-disk) format of a trace includes a small header followed by only the runtime-available data pieces. In other words, the minimal possible information required for deferring any formatting to a later stage, outside of each core's runtime.

In some implementations, a trace lifecycle may have four key phases:

(1) Preprocessing by debug process 10: at the beginning of a build process, a custom preprocessor (e.g., in-house tool, operating prior to ordinary C preprocessor) may scan all traces appearing in code and run some sanity checks (e.g., no duplicate trace IDs, trace length limit is not exceeded, and some formatting verifications, etc.). Once verification completes, the preprocessor (e.g., via debug process 10) may convert the original code of each trace into code (e.g., C code) to be executed at runtime. This runtime code may include, e.g., (a) definition of a local temporary buffer used for holding the trace header and data), (b) auto-generated code for copying each parameter's value into the corresponding offset within the temporary buffer (e.g., using memcpy with appropriate data sizes), and (c) a call to a function "adding" the trace to the current CPU core's trace buffer in RAM (a.k.a. trace_add( . . . ) function). Keeping data in binary format allows using minimal RAM space (compact footprint) as well as avoiding any expensive string manipulations at runtime (minimal performance impact). The preprocessor of debug process 10 may also create a static table mapping each unique trace ID to its associated formatting pattern as appears in source code.

(2) Build by debug process 10: As part of the code build, a trace decoder is generated by debug process 10 (e.g., as a shared library, an application with a database, etc.). It may be based on the data collected by the preprocessor and may contain all the information required for decoding a binary trace back to a human readable form. Notably, (1) and (2) above cover preprocessing and build, respectively. Their outcome is indeed part of the deployed system, but the actions made by them may take place out of the scope of a deployed product. In other words, part of a trace lifecycle may happen while generating the deploy package(s), and part may happen post-deployment.

(3) Runtime by debug process 10: At runtime, the data section of the temporary buffer may be filled with the current timestamp followed by the appropriate values (e.g., as part of executing the memcpy calls), and then trace_add( . . . ) function may be called with this buffer and the trace ID. This function populates the trace header with the trace ID, current CPU core ID, and a magic byte sequence. Each CPU core may be allocated with a separate cyclic buffer containing all traces written by the application while this core is active. The trace_add( . . . ) function may locate the RAM buffer that corresponds to the currently running CPU core and copies the temporary buffer's content as-is into the next free point of the cyclic buffer. Keeping a RAM buffer per core allows fast and lockless implementation, as no synchronization between cores is required while traces are written.

4) On-demand decoding by debug process 10: In some implementations, debug process 10 may decode 406 the binary format to human readable text on demand. For example, viewing traces as human readable text may require decoding back from binary format. This process may be done only on demand. All message formatting may be done during this phase and the resulting output may then be examined.

As will be discussed further below, debug process 10 infrastructure may offer additional extensions/features. For instance, in some implementations, debug process 10 may classify 408 each of the debug messages into different channels based upon, at least in part, retention time and usage of each of the debug messages, where in some implementations, the different channels may include a volatile channel, and in some implementations the different channels may include a persistent channel. For example, regarding trace channels, traces may be classified by debug process 10 into different tiers (a.k.a. channels), which differ primarily in retention time and usage. Each channel may have its own set of per-core RAM buffers. The following example channels may be available; (1) Volatile Channel: traces belonging to this channel may "live" in RAM only, and consequently are volatile, as the channel name suggests. Since each trace buffer in RAM is a limited sized cyclic buffer, the oldest trace gets overwritten by the newest one, once buffer is full. The main usage for this channel is to debug a short time event (e.g., circumstances of an unexpected fault). (2) Persistent Channel: like the volatile channel, traces belonging to this channel may be written into the RAM cyclic buffers. However, an external process, named trace collector (e.g., via debug process 10), is responsible for moving traces from RAM to a persistent area on disk. The main usage for this channel is to debug long-term end-to-end flows, e.g., describe a transaction.

In some implementations, debug process 10 may determine 402 that the debug message and a portion of the plurality of debug messages are associated with one or more debug levels, and in some implementations, debug process 10 may allocate 404 each respective processor core with a separate cyclic buffer that contains the information for each of the debug messages that are associated with the one or more debug levels and written while each respective processor core is active. For instance, another additional extension/feature may be trace levels, where the trace levels may be used to filter out traces. The level determines whether the current trace will be added to the RAM buffer. In some implementations, three example and non-limiting main levels are supported: Low, Medium, and High. Using trace levels enables working in different modes, for example:

High—traces in this level may be always output. This enables the "always-on" property.

Medium—traces in this level may be only output in debug mode, and not in production code.

Low—used for special debug mode. Will not be output unless explicitly turned on.

Another additional extension/feature may be trace components and flags (subcomponents), where traces can be divided into groups reflecting different system components, and each component may define its own internal log levels (a.k.a. flags). This feature introduces another level of fine-grained control over what information is being traced—debug process 10 may enable/disable the entire set of traces for some component, as well as controlling which out of the full set of a specific component's traces will be output.

Another additional extension/feature may be trace types, where the debug process 10 infrastructure may provide a means for defining new data types to be used in trace body. Each new type may have, e.g.:

(i) Name—a reference for usage in source code.

(ii) Size—specified in bytes and may have any value, which allows using non-standard variable sizes, with the minimal space required for including their data (e.g., a type of 3 bytes, derived from a 4-byte integer by applying some mask will occupy only 3 bytes in a trace buffer).

(iii) Format—used at decoding phase, at which the specific trace type is expanded into a well-known format. Using a custom defined format allows unified and formalized decoding. Optionally, a trace type may have a mask, to be further applied on the value at decode time (e.g., value is 1 byte, but only 3 bits are relevant).

For example, the following is a definition of a trace type named PATTERN, with size 1 byte:

PATTERN=TraceType(name="PATTERN", size=1, format="Data pattern: 0x %02x")

It can be used in source code as:

int ptrn=50;

TRACE_H(DP_DATA_VOLA_CH, TRACE_VOLA_ID (3695), LS_TRANSIT, LS_TRANSIT_TRACE_HIGH,

"NOTE: @PATTERN is being used!", ptrn);

At runtime, the least significant byte of the variable ptrn's value (e.g., 50) will be copied into the RAM buffer by debug process 10.

The example decoded format may look as follows:

NOTE: Data pattern: 0x32 is being used!

In addition, a special trace type named, e.g., trace enum may be defined based on an existing enumeration in code. The enumeration value at decode time may appear as a string in its decoded format, where the string is taken from the enum definition.

Another option offered by trace types is defining a new type derived by concatenating 2 other types.

In some implementations, debug process 10 may index 410 each of the debug messages by type and value. For example, another additional extension/feature may be indexing, where as the volume of persistent traces stored on disk may be very large, it requires an ability for fast and predictable search. The debug process 10 infrastructure may provide, through trace types, the option to index a pair of type+value. On-disk traces may be stored in logical units of, e.g., 100 MB each, named megachunks. Each such unit may be accompanied with 2 levels of index information; (1) data index—each trace type used within a trace body is added to a bloom filter index, used for determining whether the specific (type+value) is definitely not included in the current megachunk, or it may be included, and (2) trace ID index—a smaller bloom filter describing the set of different trace IDs used in this megachunk.

A user searching (e.g., via debug process 10) through the trace disk for debug information may look for a specific type+value. All megachunks for which the data index indicates that the requested type+value pair is not present will be skipped and their data will not be decoded at all. Similarly, a user (e.g., via debug process 10) may also search for a specific trace ID(s). All megachunks for which the trace ID index indicates that the requested IDs are not present will be skipped and their data will not be decoded. In some implementations, search may include multiple pairs of (type+value) and trace IDs and supports logical OR/AND between them. For performance reasons, the actual indexing may happen in the background by a separate process of debug process 10 and does not consume CPU time from either the application writing the traces to RAM or the application persisting the traces (a.k.a. trace collector). It will be appreciated that the above-noted decoding may occur with or without indexing, indexing may occur either before or after decoding, and indexing may impact decode speed when querying large amounts of data (not the actual decoding, but the size of the data set to decode).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   generating, by a computing device, a debug message of a plurality of debug messages, wherein a format of the debug message is a binary format that includes information, and wherein the information includes debug header information and one or more values of optional parameters;
   determining that the debug message and a portion of the plurality of debug messages are associated with one or more debug levels; and
   allocating each respective processor core with a separate cyclic buffer that contains the information for each of the debug messages that are associated with the one or more debug levels and written while each respective processor core is active.

2. The computer-implemented method of claim 1 further comprising classifying each of the debug messages into different channels based upon, at least in part, retention time and usage of each of the debug messages.

3. The computer-implemented method of claim 2 wherein the different channels include a volatile channel.

4. The computer-implemented method of claim 2 wherein the different channels include a persistent channel.

5. The computer-implemented method of claim 1 further comprising indexing each of the debug messages by type and value.

6. The computer-implemented method of claim 1 wherein a pattern of each of the debug messages is stored external from the separate cyclic buffer.

7. The computer-implemented method of claim 1 further comprising decoding the binary format to human readable text on demand.

8. A computer program product residing on a computer readable storage medium having a plurality of instructions stored thereon which, when executed across one or more processors, causes at least a portion of the one or more processors to perform operations comprising:
   generating a debug message of a plurality of debug messages, wherein a format of the debug message is a binary format that includes information, and wherein the information includes debug header information and one or more values of optional parameters;
   determining that the debug message and a portion of the plurality of debug messages are associated with one or more debug levels; and
   allocating each respective processor core with a separate cyclic buffer that contains the information for each of the debug messages that are associated with the one or more debug levels and written while each respective processor core is active.

9. The computer program product of claim 8 wherein the operations further comprise classifying each of the debug messages into different channels based upon, at least in part, retention time and usage of each of the debug messages.

10. The computer program product of claim 9 wherein the different channels include a volatile channel.

11. The computer program product of claim 9 wherein the different channels include a persistent channel.

12. The computer program product of claim 8 wherein the operations further comprise indexing each of the debug messages by type and value.

13. The computer program product of claim 8 wherein a pattern of each of the debug messages is stored external from the separate cyclic buffer.

14. The computer program product of claim 8 wherein the operations further comprise decoding the binary format to human readable text on demand.

15. A computing system including one or more processors and one or more memories configured to perform operations comprising:
   generating a debug message of a plurality of debug messages, wherein a format of the debug message is a binary format that includes information, and wherein the information includes debug header information and one or more values of optional parameters;
   determining that the debug message and a portion of the plurality of debug messages are associated with one or more debug levels; and
   allocating each respective processor core with a separate cyclic buffer that contains the information for each of the debug messages that are associated with the one or more debug levels and written while each respective processor core is active.

16. The computing system of claim 15 wherein the operations further comprise classifying each of the debug messages into different channels based upon, at least in part, retention time and usage of each of the debug messages.

17. The computing system product of claim 16 wherein the different channels include a volatile channel and a persistent channel.

18. The computing system of claim 15 wherein the operations further comprise indexing each of the debug messages by type and value.

19. The computing system of claim 15 wherein a pattern of each of the debug messages is stored external from the separate cyclic buffer.

20. The computing system of claim 15 wherein the operations further comprise decoding the binary format to human readable text on demand.

* * * * *